(12) United States Patent
Tamura

(10) Patent No.: US 9,201,371 B2
(45) Date of Patent: Dec. 1, 2015

(54) IMAGE PROCESSING APPARATUS, METHOD FOR PROCESSING IMAGE, AND STORAGE MEDIUM THEREFOR

(75) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/267,608

(22) Filed: Oct. 6, 2011

(65) Prior Publication Data

US 2012/0086987 A1   Apr. 12, 2012

(30) Foreign Application Priority Data

Oct. 7, 2010   (JP) ................ 2010-227553

(51) Int. Cl.
*H04N 1/40* (2006.01)
*G03G 15/00* (2006.01)
*G03G 15/01* (2006.01)
*G03G 21/02* (2006.01)
*H04N 1/60* (2006.01)
*H04N 1/10* (2006.01)

(52) U.S. Cl.
CPC .......... *G03G 15/5062* (2013.01); *G03G 15/011* (2013.01); *G03G 21/02* (2013.01); *H04N 1/6022* (2013.01); *H04N 1/6033* (2013.01); *G03G 2215/00029* (2013.01); *H04N 1/1017* (2013.01)

(58) Field of Classification Search
CPC .................................................. G03G 15/5062
See application file for complete search history.

(56) References Cited

U.S. PATENT DOCUMENTS

| 6,714,673 | B1 | 3/2004 | Ohta | |
|---|---|---|---|---|
| 2009/0086228 | A1* | 4/2009 | Yoshida | 358/1.9 |
| 2009/0103122 | A1* | 4/2009 | Horita et al. | 358/1.9 |
| 2009/0141295 | A1* | 6/2009 | Hayashi | 358/1.9 |
| 2010/0067932 | A1* | 3/2010 | Fujiwara | 399/55 |

FOREIGN PATENT DOCUMENTS

| CN | 1758152 A | 4/2006 |
|---|---|---|
| JP | 2001-094784 A | 4/2001 |
| JP | 2005-117241 A | 4/2005 |

* cited by examiner

*Primary Examiner* — Peter K Huntsinger
*Assistant Examiner* — Idowu O Osifade
(74) *Attorney, Agent, or Firm* — Canon USA Inc. IP Division

(57) ABSTRACT

A limit value of a recording material is determined based on a difference between a maximum density value of an image formed by an image forming unit and a maximum density value to be targeted by an image processing apparatus, and the amount of the recording material corresponding to the image data is controlled so as to be the determined limit value or below.

8 Claims, 14 Drawing Sheets

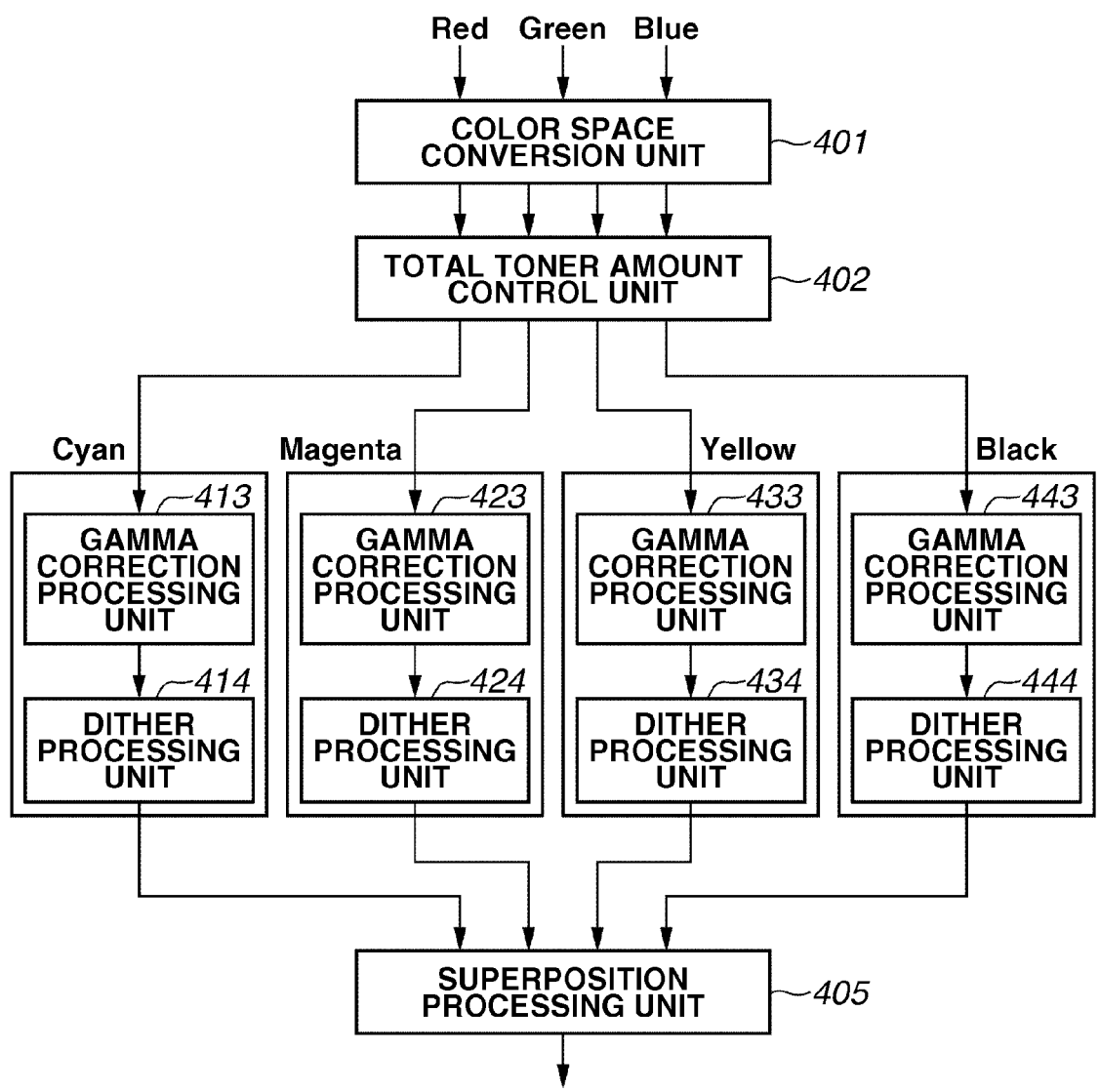

FIG.13A

|  | BEFORE TOTAL TONER AMOUNT CONTROL | | | | | AFTER TOTAL TONER AMOUNT CONTROL | | | | |
| --- | --- | --- | --- | --- | --- | --- | --- | --- | --- | --- |
|  | C | M | Y | K | TOTAL | C | M | Y | K | TOTAL |
| SIGNAL VALUE | 39 | 38 | 38 | 90 | 205 | 34 | 33 | 33 | 95 | 195 |
| EQUIVALENT VALUE | 39 | 38 | 38 | 99 | 214 | 34 | 33 | 33 | 104.5 | 204.5 |

FIG.13B

|  | BEFORE TOTAL TONER AMOUNT CONTROL | | | | | AFTER TOTAL TONER AMOUNT CONTROL | | | | |
| --- | --- | --- | --- | --- | --- | --- | --- | --- | --- | --- |
|  | C | M | Y | K | TOTAL | C | M | Y | K | TOTAL |
| SIGNAL VALUE | 100 | 100 | 5 | 0 | 205 | 95 | 95 | 0 | 5 | 195 |
| EQUIVALENT VALUE | 100 | 100 | 5 | 0 | 205 | 95 | 95 | 0 | 5.5 | 195.5 |

IMAGE PROCESSING APPARATUS, METHOD FOR PROCESSING IMAGE, AND STORAGE MEDIUM THEREFOR

BACKGROUND OF THE INVENTION

1. Field of the Invention

The present invention relates to an image processing apparatus, a method for processing an image, and a storage medium therefor.

2. Description of the Related Art

The electrophotographic method is known as an image recording method used for image processing apparatuses such as printers and copying machines. The electrophotographic method forms a latent image on a photosensitive drum by using a laser beam and develops the latent image by a charged color material (hereinafter referred to as toner) to form a toner image. To record an image, the electrophotographic method transfers the developed toner image onto a transfer sheet and then fixes the transferred image.

Conventionally, when an image forming unit employs the electrophotographic method, electrophotographic processes such as laser exposure, latent image formation on a photosensitive member (drum), image development by toner, toner image transfer onto paper, and image fixing by heat are susceptible to the apparatus ambient temperature and humidity as well as to aging of apparatus components. Therefore, the toner amount to be finally fixed onto paper changes each time. Such instability is not specific to the electrophotographic method but known to similarly occur in the ink-jet method, heat transfer method, and other various recording methods.

To solve such issue, a certain technique outputs a test pattern image from an image processing apparatus, measures the density of the output test pattern, and corrects the characteristics of the image forming unit based on the measured density. With a method for correcting nonlinear characteristics used in this technique, a look-up table is generally used.

With this method, a maximum density targeted by the apparatus (hereinafter referred to as target maximum density of the apparatus) is set in advance and the nonlinear characteristics are corrected aiming to smoothly achieve intended gradation up to the maximum density. However, since the maximum density may be exceeded depending on the apparatus state, the excessive density may be restrained by using the above-described look-up table. In this case, restraining an upper-limit density may cause a problem that jaggies or discontinuities of images are produced when outputting texts and thin lines having the maximum density. To solve this problem, a technique has been discussed which enables a user to select a look-up table for forcibly correcting an upper-limit density to a maximum value to ensure that an input with a maximum density be output with the maximum density (for example, Japanese Patent Application Laid-Open No. 2001-094784).

Meanwhile, if the amount of recording material such as toner and ink exceeds a certain fixed amount per unit area, inferior fixing or scattering of toner may occur possibly causing degradation in image quality as well as damage to the apparatus. Therefore, the total recording material amount per unit area is controlled so as to constantly fall below a preset fixed amount. In the case of a color printer, for example, to prevent excessive toner amount reduction, a certain method reduces the total toner amount per unit area by changing the combination of four colors (cyan, magenta, yellow, and black) of toner. More specifically, it is common to increase the amount of black toner, instead of reducing an equal amount of cyan, magenta, and yellow toner, to minimize change in tint and degradation in gradation.

However, as described above, if an output exceeds the target maximum density of the apparatus to reduce jaggies under the situation that the upper-limit recording material amount per unit area is predetermined, image defects such as inferior fixing and scattering of recording material may occur.

For example, suppose that, when the target maximum density of the apparatus is estimated to be 1.5 and the apparatus outputs an image having a density of 1.6 in a certain environment. This case will cause excessive recording material. With a technique discussed in Japanese Patent Application Laid-Open No. 2001-094784, although jaggies are reduced, the recording material amount per unit area may exceed the upper limit if a maximum density output is permitted. (Hereinafter, toner, ink, and other recording materials will be collectively referred to as toner.)

If a toner amount limit is set in a small value by estimating much increase in density of the image, when an image to be printed has a low density, a toner amount may be excessively reduced depending on the printer characteristics. Increasing the toner amount generally increases the image density and color depth, enabling more desirable color reproduction. Therefore, it is said that minimizing the toner reduction amount produces a preferable image quality.

SUMMARY OF THE INVENTION

The present invention relates to an image processing apparatus capable of appropriately setting a limit value of a recording material according to the state of the image processing apparatus without excessively reducing the recording material amount, a method for processing an image, and a storage medium therefor.

According to an aspect of the present invention, an image processing apparatus capable of controlling an amount of a recording material corresponding to image data includes a storage unit configured to store a gradation correction table calculated based on data acquired by reading a patch pattern formed by an image forming unit, a calculation unit configured to calculate a maximum density value of an image formed by the image forming unit using an output signal value corresponding to a maximum value of an input signal in the gradation correction table and a maximum density value to be targeted by the image processing apparatus, a determination unit configured to determine a limit value of the recording material based on a difference between the maximum density value calculated by the calculation unit and the maximum density value to be targeted by the image processing apparatus, and a control unit configured to control the amount of the recording material corresponding to the image data to be equal to or less than the limit value determined by the determination unit.

According to the present invention, it is possible to appropriately set the limit value of the recording material according to the state of the image processing apparatus without excessively reducing the recording material amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a block diagram illustrating an image processing flow according to the exemplary embodiment of the present invention.

FIGS. 13A and 13B illustrate exemplary results of processing for controlling the total toner amount according to the exemplary embodiment of the present invention.

DESCRIPTION OF THE EMBODIMENTS

Various exemplary embodiments, features, and aspects of the invention will be described in detail below with reference to the drawings.

[Configuration of Image Processing Apparatus]

Figure 1:
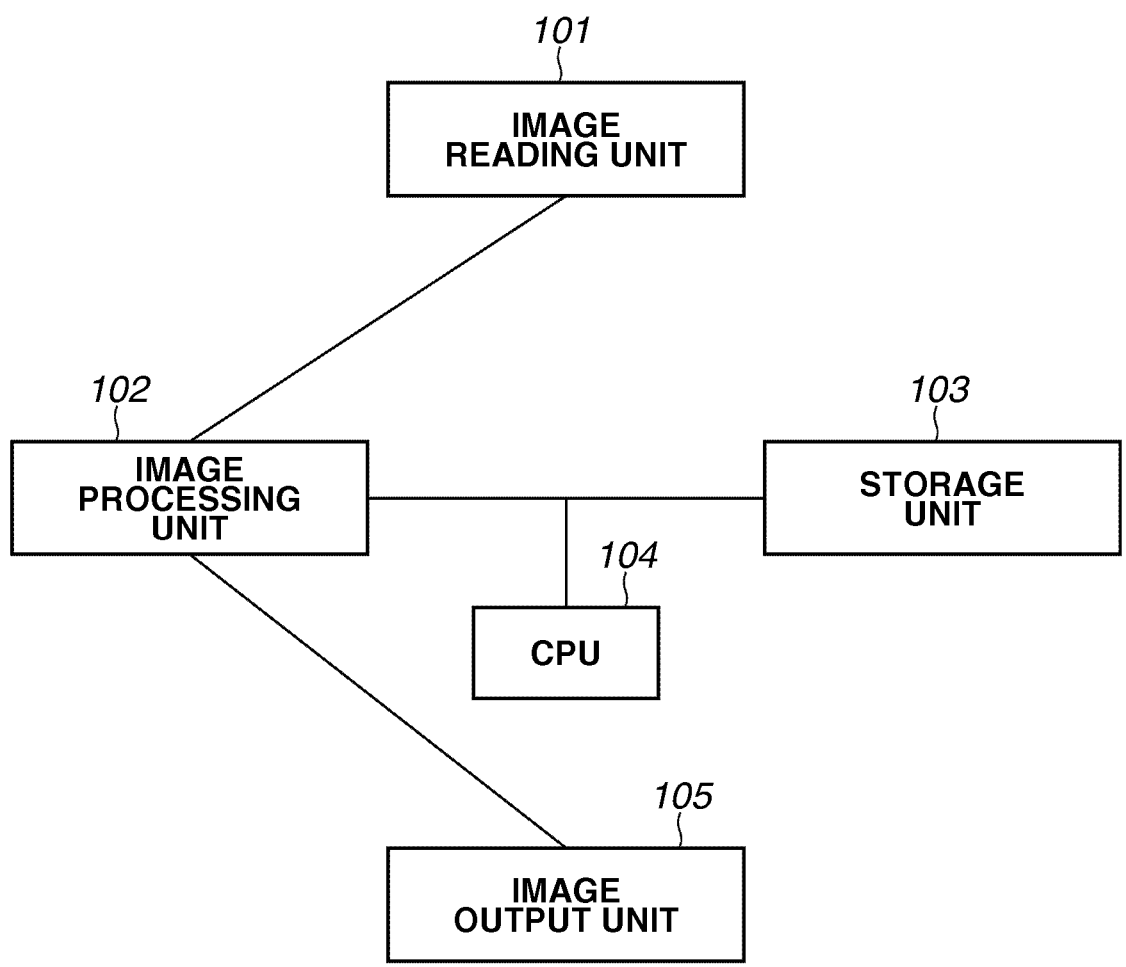
FIG. 1 is a block diagram illustrating an overall configuration of an image processing apparatus according to an exemplary embodiment of the present invention.

FIG. 1 is a block diagram illustrating a configuration of an image processing apparatus according to first, second, and third exemplary embodiments. As illustrated in FIG. 1, the image processing apparatus includes an image reading unit 101, an image processing unit 102, a storage unit 103, a central processing unit (CPU) 104, and an image output unit 105. The image processing apparatus is connectable with a server for managing image data and a personal computer (PC) for instructing execution of printing via a network. The image reading unit 101 reads a document image and outputs relevant image data.

The image processing unit 102 converts print information including image data input from the image reading unit 101 or outside into intermediate information, applies image correction such as density correction to the intermediate information, and stores the intermediate information in an object buffer of the storage unit 103. The image processing unit 102 further generates bit map data based on the stored intermediate information, applies color space conversion processing, total toner amount control processing, printer gamma correction processing, and halftone processing such as dither processing to the bit map data, and prints the data from the image output unit 105 (printer). The processing will be described in detail below.

The storage unit 103 includes a read only memory (ROM), a random access memory (RAM), a hard disk (HD), and the like. The ROM stores various types of control programs and image processing programs to be executed by the CPU 104. The RAM is used as a data reference area and a data working area. The RAM and HD are used when the above-described object buffer is stored. In the RAM and HD, image data pieces are accumulated, pages are sorted, documents including a plurality of sorted pages are accumulated, and a plurality of copies is printed out. The image output unit 105 forms and outputs a color image on a recording medium such as a recording sheet.

[General View of Apparatus]

Figure 2:
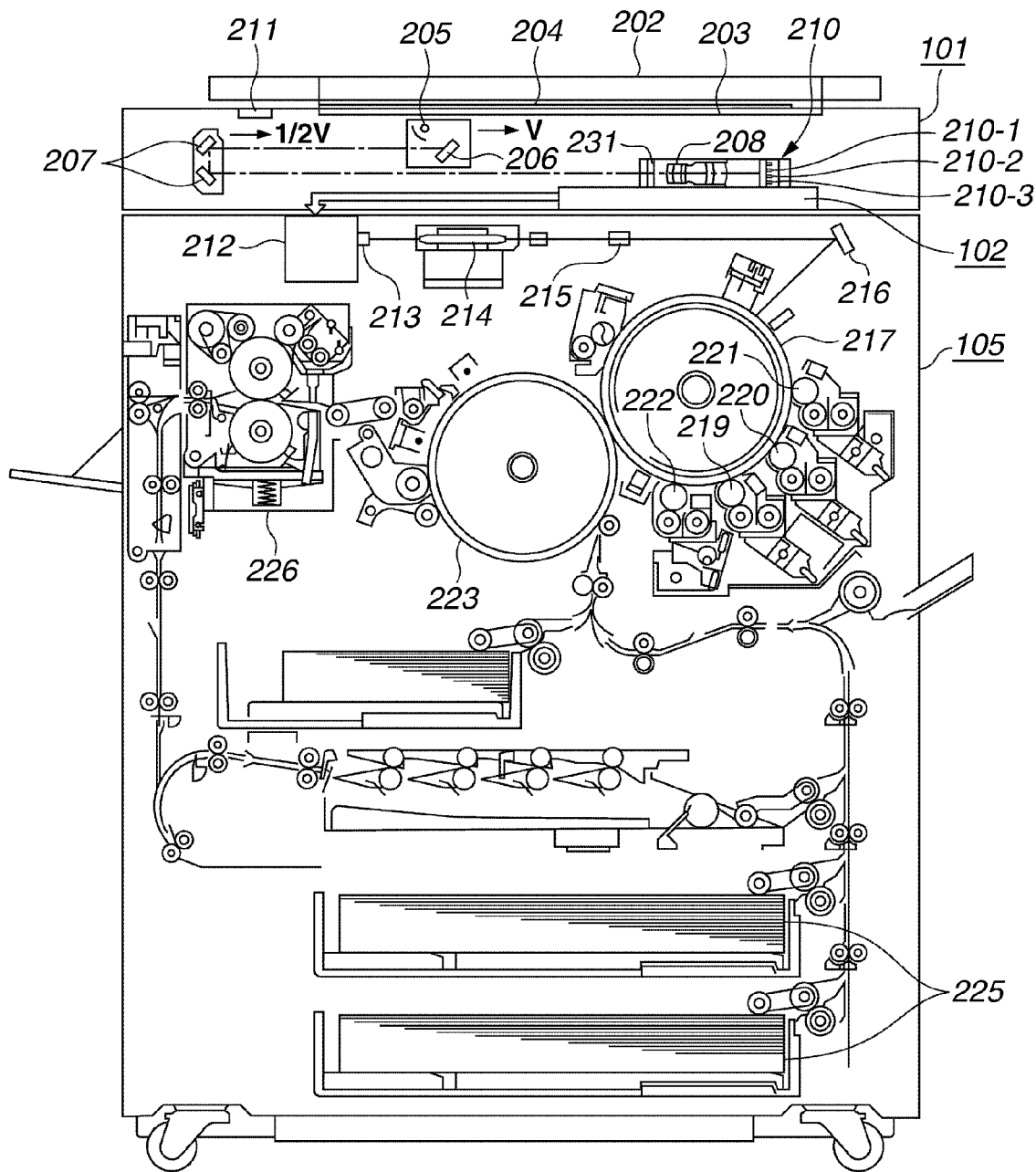
FIG. 2 is a general view illustrating the image processing apparatus according to the exemplary embodiment of the present invention.

FIG. 2 is a general view illustrating the image processing apparatus. With the image reading unit 101, a document 204, which is a target of image reading, is placed between a document positioning glass plate 203 and a document pressing plate 202, and then irradiated with light from a lamp 205. Reflected light from the document 204 is led to mirrors 206 and 207, and an image is focused on a three-line sensor 210 by a lens 208. The lens 208 is provided with an infrared cut filter 231. A motor (not illustrated) moves a mirror unit including the mirror 206 and the lamp 205 at a speed V and a mirror unit including the mirrors 207 at a speed V/2 in a direction indicated by arrows in FIG. 2. More specifically, the two mirror units move in a direction (sub scanning direction) perpendicular to the electrical scanning direction (main scanning direction) of the three-line sensor 210 to scan an entire surface of the document 204.

The three-line sensor 210 including three lines of charge-coupled devices (CCDs) performs color separation of input optical information, reads color components (red (R), green (G), and blue (B)) as full-color information, and transmits respective color component signals to a signal processing unit 209. Each of the CCDs constituting the three-line sensor 210 includes photosensitive elements for 5000 pixels, and is capable of reading an A3-size document, which is a maximum document size that can be placed on the document positioning glass plate 203, in the widthwise direction (297 mm) with a resolution of 600 dots per inch (dpi).

A standard white plate 211 is used to correct data read by CCDs 210-1, 210-2, and 210-3 of the three-line sensor 210. The color of the standard white plate 211 is white which reveals almost uniform reflective characteristics with visible light.

The image processing unit 102 electrically processes image signals input from the three-line sensor 210 to generate cyan (C), magenta (M), yellow (Y), and black (K) color component signals and then transmits the generated CMYK color component signals to the image output unit 105. In this case, the image processing unit 102 outputs CMYK images having undergone the halftone processing such as dither processing.

The image output unit 105 receives cyan (C), magenta (M), yellow (Y), and black (K) image signals from the image reading unit 101 and then transmits them to a laser driver 212. The laser driver 212 modulatingly drives a semiconductor laser element 213 according to the input image signals. The laser beam output from the semiconductor laser element 213 scans a photosensitive drum 217 via a polygon mirror 214, an f-θ lens 215, and a mirror 216 to form an electrostatic latent image on the photosensitive drum 217.

A developing unit includes a magenta developing unit 219, a cyan developing unit 220, a yellow developing unit 221, and a black developing unit 222. The four developing units sequentially come in contact with the photosensitive drum 217 to develop the electrostatic latent image formed on the photosensitive drum 217 by respective color toners to form a toner image. A recording sheet supplied from a recording sheet cassette 225 is wrapped around a transfer drum 223, and the toner image on the photosensitive drum 217 is transferred onto the recording sheet.

The images of four colors (C, M, Y, and K) which have been sequentially transferred onto the recording sheet are fixed thereto by passing through a fixing unit 226. Then, the recording sheet is discharged to the outside of the apparatus.

The color space conversion processing, total toner amount control processing, gamma correction processing, and dither processing by the above-described image processing unit 102 will specifically be described below with reference to FIG. 4. A color space conversion unit 401 converts RGB gradation image data input from an external apparatus via a network and RGB gradation image data input from a scanner into a CMYK color space.

CMYK values correspond to toner colors of the printer, and the CMYK color space is a color space dependent on the printer device. The color space conversion unit 401 achieves the color space conversion processing by using a known three-dimensional LUT. The three-dimensional LUT is set up so that the converted CMYK values have a linear relation with respective toner densities.

More specifically, when the color space conversion unit 401 outputs 8-bit multivalued data, an output 0 indicates a density 0, an output 255 indicates the target maximum density of the printer, and an output 128 indicates a half of the maximum density. The toner amount is represented on an assumption that an output with the target maximum density is 100%.

Subsequently, the total toner amount control unit 402 performs the total toner amount control processing. More specifically, the total toner amount control unit 402 replaces a part of the C, M, and Y toner with the K toner to perform the total toner amount control processing. In this case, limit values differ according to the state and target density of the printer. The processing will be described in detail below.

Then, gamma correction processing units 413, 423, 433, and 443 apply the gamma correction processing to colors C, M, Y, and K, respectively. The gamma correction processing absorbs the nonlinear characteristics of the gradation of each color dependent on the printer device to correct each color to the target gradation. This processing is performed based on a one-dimensional LUT. A method for creating the one-dimensional LUT will be described in detail below.

Then, the dither processing units 414, 424, 434, and 444 apply the pseudo-halftone processing to the multivalued CMYK gradation image having undergone the gamma correction processing. This processing is performed through the known dithering processing or error diffusion processing. The pseudo-halftone processing converts the multivalued image data having undergone the gamma correction into binary-processed data.

Figure 3A:
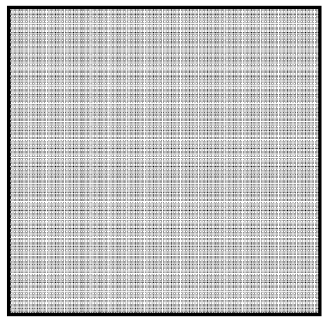
FIGS. 3A to 3H schematically illustrate states of binary processing based on dithering.
Figure 3B:
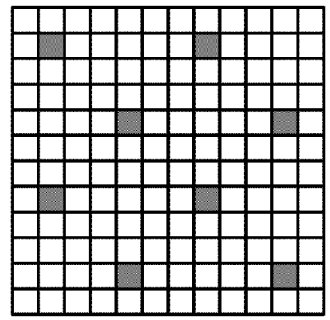
Figure 3C:
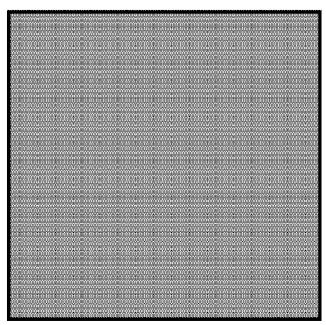
Figure 3D:
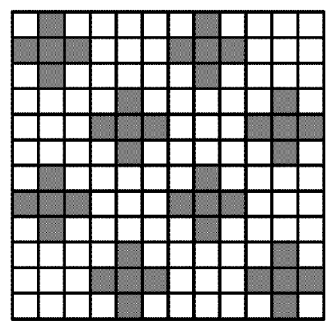
Figure 3E:
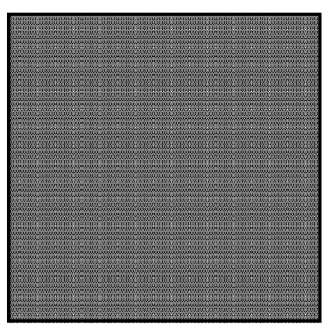
Figure 3F:
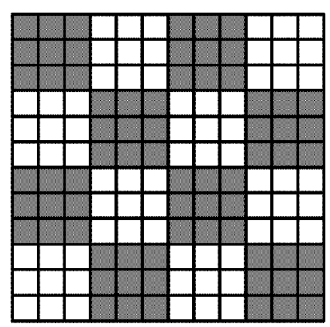
Figure 3G:
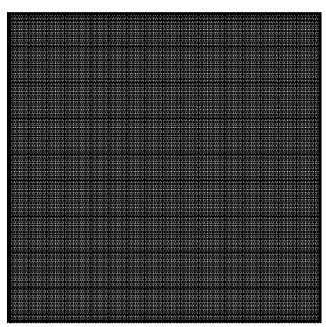
Figure 3H:
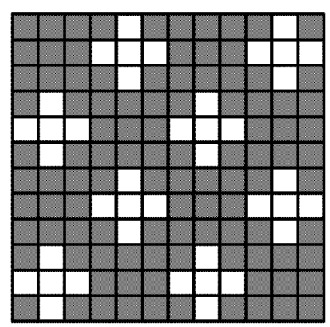

FIGS. 3A to 3H illustrate exemplary binary processing. Applying the pseudo-halftone processing to a multivalued image in FIG. 3A gives a binary image in FIG. 3B. Likewise, applying the pseudo-halftone processing to a multivalued image in FIG. 3C gives a binary image in FIG. 3D; applying the pseudo-halftone processing to a multivalued image in FIG. 3E gives a binary image in FIG. 3F; and applying the pseudo-halftone processing to a multivalued image in FIG. 3G gives a binary image in FIG. 3H.

By applying the pseudo-halftone processing to a multivalued image in this way, an input multivalued image is reproduced in pseudo-gradation. Therefore, except when the value of an input multivalued image is not the maximum value, some sort of lack of dots occurs resulting in jaggies or broken lines in an output image depending on an input image. (Hereinafter, a region having the maximum pixel value of image is referred to as solid region. In other words, the solid region is output with the maximum density which causes neither jaggies nor discontinuities.)

Then, a superposition processing unit 405 superimposes a plurality of images, which are C, M, Y and K images that have undergone the pseudo-halftone processing. The superimposed images are output from the printer, thus a full-color image is output.

The above-described total toner amount control unit 402 and gamma correction processing units 413, 423, 433, and 443 need to update setting values according to the printer state which varies with the influence of the environment where the printer is installed. Details on the total toner amount control unit 402 and the gamma correction processing units 413, 423, 433, and 443 and a method for calculating setting values characterizing the present exemplary embodiment of the present invention will be described below.

Figure 5:
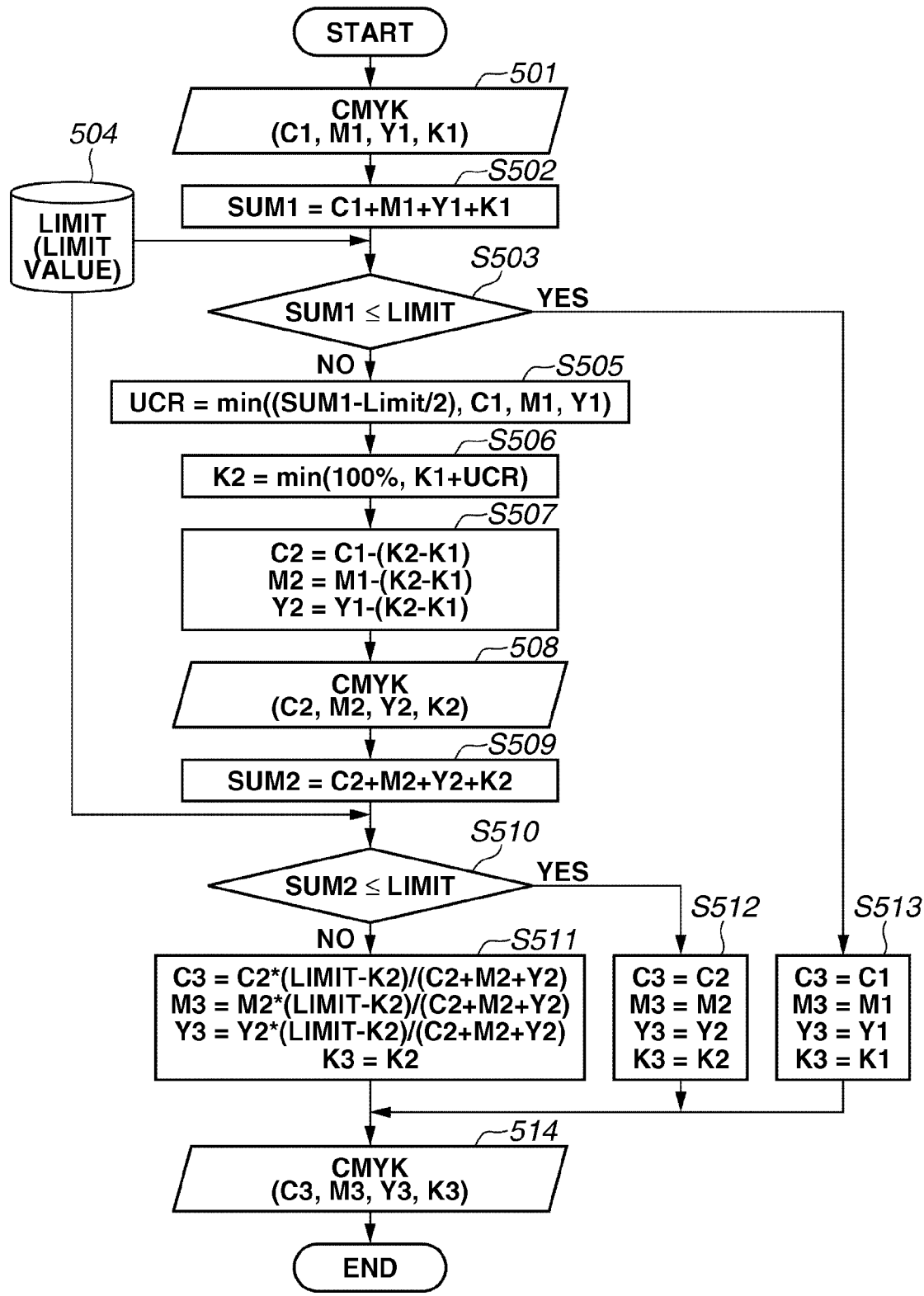
FIG. 5 is a flow chart illustrating processing for controlling the total toner amount according to the exemplary embodiment of the present invention.

FIG. 5 is a flow chart illustrating processing of the total toner amount control unit 402. The total toner amount control unit 402 applies on a pixel basis the processing in FIG. 5 to the image having undergone the above-described color space conversion processing. The total toner amount control unit 402 performs the processing in FIG. 5 with reference to the CMYK values for each pixel.

In step S502, the total toner amount control unit 402 calculates a sum SUM1 of values of C1, M1, Y1, and K1 for a target pixel value CMYK (C1, M1, Y1, K1) 501 of a CMYK image input to the total toner amount control unit 402. CMYK (C1, M1, Y1, K1) 501 denotes CMYK image data on a pixel basis generated in the color space conversion processing performed by the color space conversion unit 401.

In step S503, the total toner amount control unit 402 reads LIMIT (limit value) 504 and compares it with SUM1. LIMIT (limit value) 504 is a limit value of a toner amount which can be fixed, and is defined by a numerical value, such as "250%." Fixing of a toner amount exceeding LIMIT (limit value) 504 may raise concerns for degradation in image quality of an output image and damage to the image output unit 105, thus it is necessary to restrain the final total toner amount to LIMIT (limit value) 504 or less.

When the total toner amount control unit 402 determines that SUM1 is equal to or less than LIMIT (limit value) 504 (YES in step S503), the processing proceeds to step S513. In step S513, the total toner amount control unit 402 outputs CMYK (C1, M1, Y1, K1) 501 as CMYK (C3, M3, Y3, K3) 514. CMYK (C3, M3, Y3, K3) 514 denotes CMYK image data on a pixel basis which is an output value of the total toner amount control unit 402.

In step S503, if the total toner amount control unit 402 determines that SUM1 is larger than LIMIT (limit value) 504 (NO in step S503), the processing proceeds to step S505. In step S505, the total toner amount control unit 402 calculates a UCR value by using formula (1).

$$UCR = \min((SUM1 - Limit/2)(C1, M1, Y1)) \quad \text{Formula (1)}$$

where the UCR value affects a reduction value of the C, M, and Y toner and an increase value of the K toner. To minimize the toner amount reduction value, the total toner amount control unit 402 sets a half of the amount exceeding the limit value, or the smallest value among C1, M1, and Y1 to the UCR value.

In step S506, the total toner amount control unit 402 calculates K2 out of C2, M2, Y2, and K2 which are values after first total toner amount limitation. Although the sum of K1 and the UCR value is basically set to K2, K2 alone cannot be set to a value exceeding 100%. Therefore, if K2 alone exceeds 100%, 100% is set to K2.

In step S507, the total toner amount control unit 402 reduces the values of C1, M1, and Y1, and calculates the values of C2, M2, and Y2, respectively, by using formula (2).

$$C2 = C1 - (K2 - K1)$$

$$M2 = M1 - (K2 - K1)$$

$$Y2 = Y1 - (K2 - K1) \quad \text{Formula (2)}$$

In this case, the difference between the values of K2 and K1 calculated in step S506 is the reduction value. The total toner amount control unit 402 performs the above-described processing flow to calculate CMYK (C2, M2, Y2, K2) 508 with reduced total toner amount.

In step S509, the total toner amount control unit 402 sums up C2, M2, Y2, and K2 to obtain SUM2. In step S510, the total toner amount control unit 402 reads LIMIT (limit value) 504 and compares it with SUM2. When the total toner amount control unit 402 determines that SUM2 is equal to or less than LIMIT (limit value) 504 (YES in step S510), the processing proceeds to step S512.

In step S512, the total toner amount control unit 402 outputs CMYK (C2, M2, Y2, K2) 508 as CMYK (C3, M3, Y3, K3) 514. When the total toner amount control unit 402 determines that SUM2 is larger than LIMIT (limit value) 504 (NO in step S510), the processing proceeds to step S511.

In step S511, the total toner amount control unit 402 calculates the values of C3, M3, and Y3 by using formula (3).

$$C3 = C2 * (LIMIT - K2)/(C2 + M2 + Y2)$$

$$M3 = M2 * (LIMIT - K2)/(C2 + M2 + Y2)$$

$$Y3 = Y2 * (LIMIT - K2)/(C2 + M2 + Y2)$$

$$K3 = K2 \quad \text{Formula (3)}$$

In step S511, the total toner amount control unit 402 sets the value of K2 to K3 as it is. Then, a coefficient is calculated from a value subtracting K2 from LIMIT (limit value) 504 and the sum of C2, M2, and Y2. Further, the obtained coefficient is multiplied by C2, M2, and Y2 to obtain C3, M3, and Y3, respectively, with reduced toner amount. Then, CMYK (C3, M3, Y3, K3) 514 is output.

This processing makes it possible to update the sum of the CMYK values to a value not exceeding the LIMIT setting, and ensures that the toner consumption does not exceed a total toner amount on a pixel basis estimated for the apparatus. As a result, inferior fixing and scattering of toner and other image failure can be prevented.

The above-described limit value is represented in percentage as the sum of values of four colors. Therefore, the maximum limit value is 400%. This limit value varies depending on the processing for creating the one-dimensional LUT used by the gamma correction processing units 413, 423, 433, and 443, which are described below.

A method for creating one-dimensional LUT for gamma processing will be described below.

As described above, the toner density (toner amount) on paper is affected by the apparatus ambient temperature and humidity as well as aging of apparatus components. Since processing for correcting the gradation is necessary to absorb this instability, the gamma correction processing units 413, 423, 433, and 443 perform the gamma correction processing. However, the gamma correction processing units 413, 423, 433, and 443 cannot keep operating with an initial gamma correction value. It is necessary to update (calibrate) the gamma correction value to follow the change in the environmental conditions.

A specific method for correcting the gamma correction value will be described below with reference to FIG. 6. In step S601, an image forming unit (the image output unit 105) outputs a test pattern image, i.e., a patch pattern, as illustrated in FIG. 7. The output pattern includes eight rectangular printing areas having eight different levels corresponding to 0 to 100% toner adhesion rate for each of CMYK toner, providing a total of 32 rectangular printing areas. The eight levels of rectangular printing areas are referred to as patch No. 0 to 7.

Regarding a printer output signal value of the each patch, the leftmost patch No. 0 corresponds to the printer output signal value of 0, the patch No. 1 corresponds to the printer output signal value of 36, and the patch No. 2 corresponds to the printer output signal value of 73. Likewise, the patch No. 7 corresponds to a printer output signal value of 255, and the eight patches are arranged at equal intervals of the printer output signal value in this way. This patch arrangement is provided for each of CMYK toner in this order from the top.

The CPU 104 stores test pattern data corresponding to the test pattern in FIG. 7 in the storage unit 103 and then applies the dither processing by the dither processing units 414, 424, 434, and 444 to the stored test pattern data without applying the gamma correction processing thereto. Then, the CPU 104 outputs the test pattern having undergone the dither processing from the printer (image forming unit), so that the current printer gradation can be grasped.

In step S602, the image reading unit 101 (reader scanner) reads the test pattern printed in step S601 to acquire RGB image data. In this case, the image reading unit 101 reads the C (cyan) patches as an R signal, the M (magenta) patches as a G signal, and the Y (yellow) patches as a B signal. By reading the patches of each color as a signal of its complementary color in this way, the gradation can be accurately acquired from high density to highlight.

In step S603, the CPU 104 averages read signal values corresponding to respective patches in FIG. 7 over the patch area to calculate a representative read signal value for each patch. In step S604, the CPU 104 converts the average patch value obtained in step S603 to a density value. Since a read signal from the reader scanner is read as a linear signal with respect to the reflectance, logarithmic conversion is generally applied to conversion to density. For example, when the input luminance is read as an 8-bit signal, formula (4) can be applied.

$$D = -255 * \log 10(S/255)/1.6 \quad \text{Formula (4)}$$

Formula (4) normalizes a luminance signal S so that a density D becomes 255 when the document density is 1.6. If the density D exceeds 255, it needs to be limited to 255. The density may be calculated using formula (4), or obtained through density conversion using a table having a luminance as input and a density as output.

Figure 8:
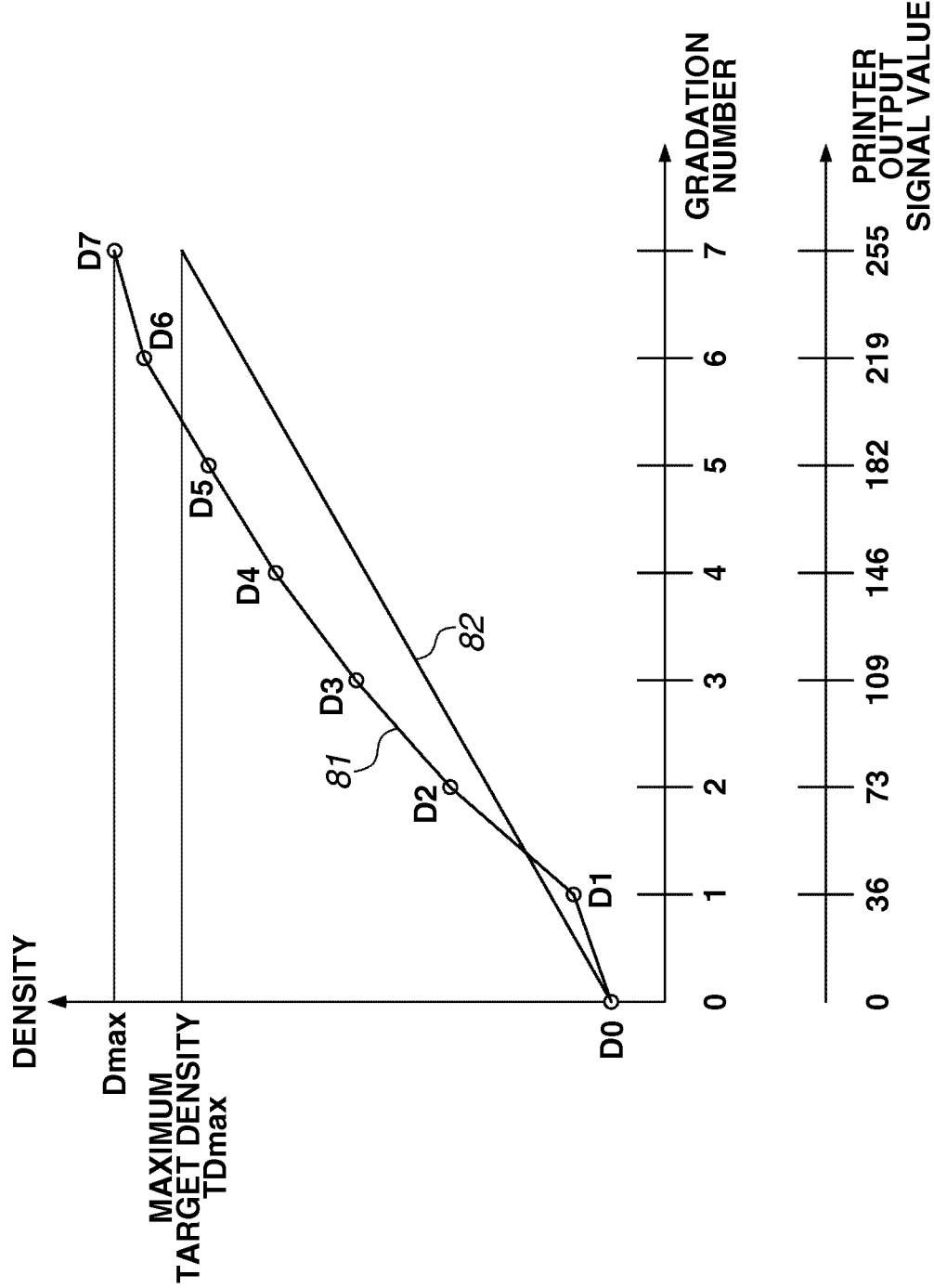
FIG. 8 is a graph illustrating an exemplary result of test pattern density measurement according to the exemplary embodiment of the present invention.

FIG. 8 is a graph illustrating an example of a result of density measurement obtained in this way. In the result, the density of each patch is marked "o." The density of patch No. 0 is plotted as D0, the density of patch No. 1 is plotted as D1, and so on. From the density characteristics illustrated in FIG. 8, it can be identified that the density when the printer outputs a solid region (when the printer output signal value is 255) is plotted as D7. Although D7 indicates the maximum density value that can be output by the printer, printing an image with the density D7 may cause scattering of toner since scattering of toner is not taken into consideration.

The CPU 104 separately stores the density at the time of solid region output (hereinafter referred to as solid region output density DMax) for the purpose of calculating a toner amount limit value, which is described below. In step S605, to correct the above-described density characteristics (a density curve 81), the CPU 104 corrects and outputs the CMYK values using a table having the inverse characteristics of the density curve 81, thus achieving the target gradation. The target gradation is a fixed target estimated for the printer in advance. Thus, correcting the characteristics aiming at the target gradation ensures an identical gradation state even with a printer having tint and gradation changes by aging.

Figure 9:
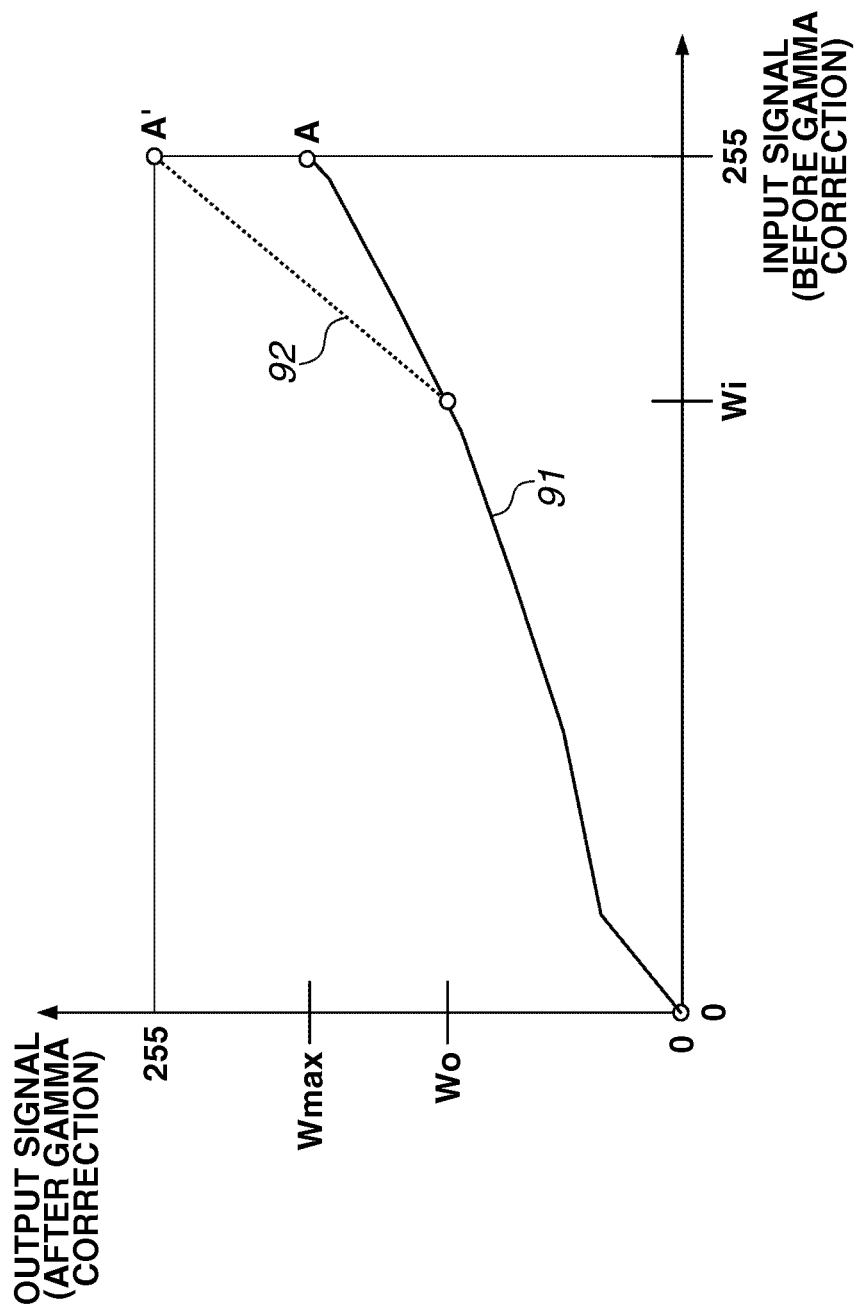
FIG. 9 is a graph illustrating an exemplary gamma correction LUT according to the exemplary embodiment of the present invention.

A curve 91 in FIG. 9 represents the characteristics of the actual correction table. The curve 91 has the inverse characteristics of a measurement result 81 for the test pattern. In other words, the curve 91 represents the characteristics which is axisymmetical to the measurement result 81 centering on a target 82. However, with a gamma correction table (gradation correction table) of the curve 91 in FIG. 9, an input 255 before gamma correction will not become 255 after gamma correction. This means that correcting the output value after gamma correction in FIG. 9 to 255 (solid region output) will cause an output density exceeding the target maximum density of the printer.

Further, it also means that applying gamma correction using the gamma correction table (gradation correction table) 91 with solid region input (input signal value of 255) will cause a partial lack of dots by the dither processing, as illustrated in FIG. 3, since the output does not become 255 after gamma correction.

As illustrated in FIG. 9, correcting a terminal point A of the gamma correction table 91 to a point A' ensures an output value of 255 (maximum gradation level of the output signal) with respect to an input value of 255 (maximum gradation level of the input signal). In the gradation correction table 91 in FIG. 9, a point at which the input signal value is 255 is set as a terminal point.

As a specific method for correcting the terminal point, the CPU 104 sets a straight line (a dashed line 92 in FIG. 9) connecting from a point (Wi, Wo) to a point (255, 255) as a new correction table. The point (Wi, Wo) has an input value Wi and an output value Wo, and the point (255, 255) has maximum input and output values. In step S606, by applying the processing for correcting the terminal point in this way, the terminal point can be corrected while maintaining the continuity of gradation although the gradation partially deviates from the target gradation.

Applying gamma correction (gradation correction) by using the gamma correction table 92 having undergone the above-described terminal point correction enables outputting all kinds of objects as a solid image. This processing can prevent, for example, dots in lines and texts from being partially lacked. Thus, lines and texts can be preferable reproduced.

The CPU 104 applies this processing to each color to create four different gamma correction tables for respective CMYK colors. Applying gamma correction to four colors using the respective gamma correction tables enables absorbing apparatus state fluctuations, thus constantly outputting the target gradation and tint. Further, the CPU 104 stores these gamma correction tables in the storage unit 103 in the image processing apparatus and maintains them therein until they are changed.

Although the reader scanner of the image processing apparatus is used as means to calculate patch densities in step S602 (FIG. 6), the method for calculating patch densities is not limited thereto. Densities can also be obtained with other methods such as a densitometer.

A method for calculating the limit value 504 for total toner amount control in FIG. 5 will be described below with reference to FIG. 10. This method uses the solid region output density DMax calculated in step S604 in FIG. 6 and characterizes the present exemplary embodiment.

As described above, a limit value needs to be set so as not to exceed an upper limit value estimated to be the total toner amount. For example, if the printer fails with a toner amount exceeding 250%, the CPU 104 sets an estimated limit value to 250%. The estimated limit value is a fixed value predetermined for each printer, and does not vary with the printer state.

When the printer outputs the target maximum density (hereinafter referred to as TDMax), the printer consumes the 100% toner amount. Therefore, when the value of DMax exceeds TDMax at the terminal point as described above, the printer consumes a toner amount exceeding 100%. This means that, when the printer outputs a solid region in this state, the printer consumes more than 100% toner amount for one color. Even if the toner amount is controlled with the estimated limit value set to 250% as described above, applying the gamma correction processing by using the gamma correction tables having undergone subsequent terminal point correction will permit toner consumption exceeding the estimated limit value. As the result, it becomes impossible to control the toner amount so that toner does not scatter.

Therefore, the toner amount limit value in the total toner amount control unit 402 is calculated by using a newly acquired density DMax.

Figure 10:
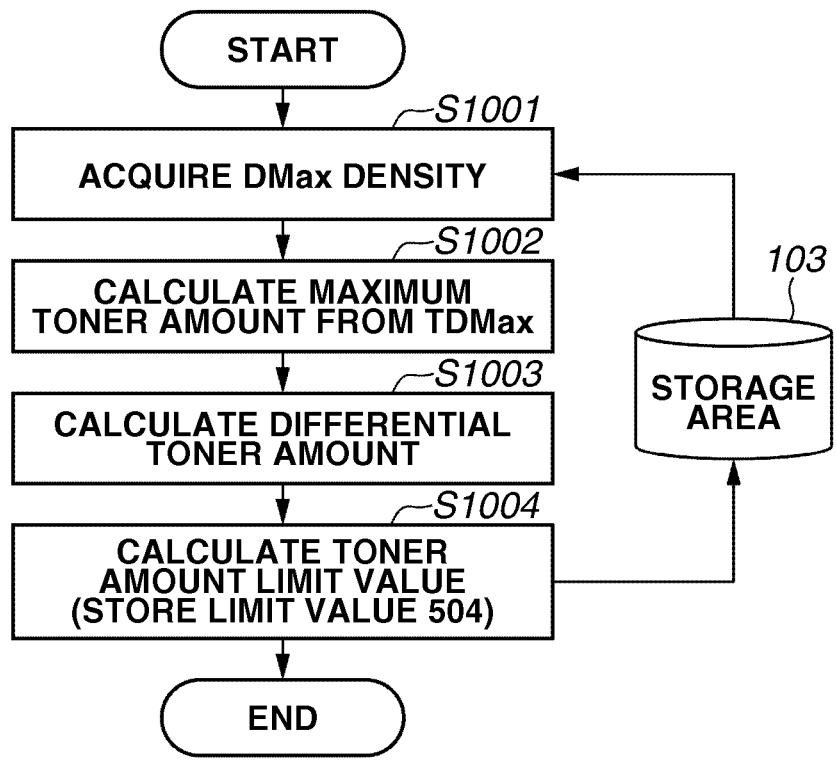
FIG. 10 is a flow chart illustrating processing for calculating total toner amount control values according to the exemplary embodiment of the present invention.

FIG. 10 is a flow chart illustrating processing for calculating the toner amount limit value in the total toner amount control unit 402 by using the density DMax. The flow chart in FIG. 10 is implemented by the CPU 104 loading a program for executing each step of the flow chart in FIG. 10 from the storage unit 103 to a RAM (not illustrated) and executing it.

Figure 6:
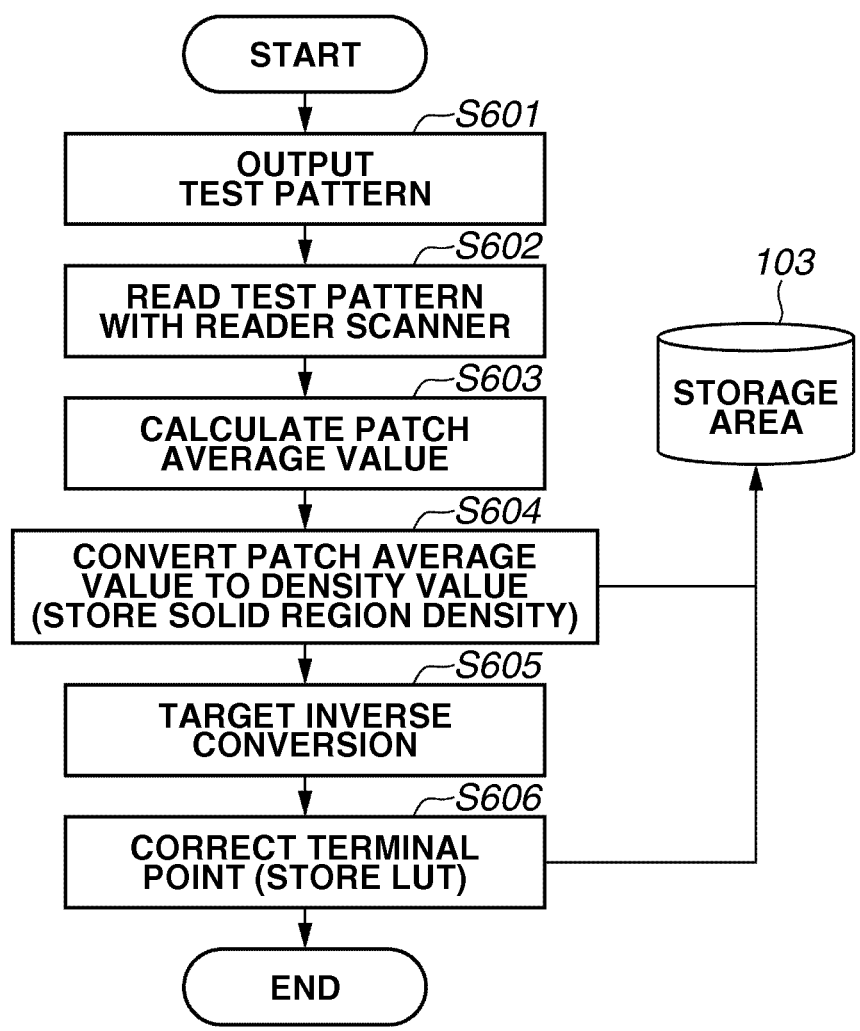
FIG. 6 is a flow chart illustrating processing for creating a gamma correction look-up table (LUT) according to the exemplary embodiment of the present invention.
Figure 7:
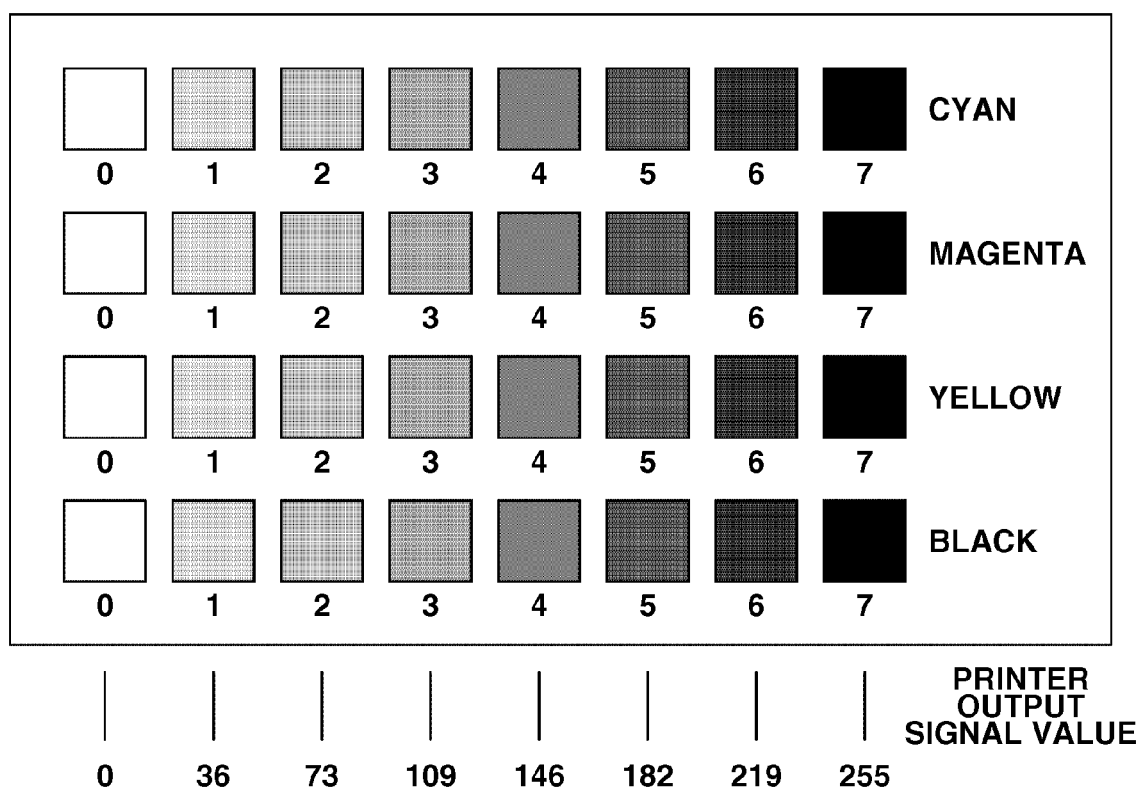
FIG. 7 illustrates a test pattern for creating a gamma correction LUT according to the exemplary embodiment of the present invention.

In step S1001, the CPU 104 acquires the density DMax (a density measurement value for the patch having a printer output signal value of 255) calculated in step S604 (FIG. 6).

In step S1002, the CPU 104 calculates the maximum toner amount for each color from the densities TDMax and DMax, for example, by using formula (5).

$$TonrMax = DMax * 100 / TDMax \qquad \text{Formula (5)}$$

where TonrMax exceeds 100% when DMax>TDMax.

In step S1003, the CPU 104 subtracts 100 from TonrMax to obtain the toner amount exceeding the estimated limit value.

In step S1004, the CPU 104 subtracts the toner amount calculated in step S1003 from the estimated limit value to obtain a new limit value 504. The new limit value 504 is assumed to be larger than a predetermined value not to become too small.

Applying the processing in steps S1001 to S1004 to each of CMYK colors enables calculation of the toner amount limit value (recording material limit value) 504.

For example, when the density DMax is 1.7 in an apparatus having C (cyan) density TDMax of 1.6, the C (cyan) toner amount (TonrMax) at the time of solid region output is 106.25%, exceeding the limit value by 6.25%. Likewise, for each of M (magenta), Y (yellow), and K (black), the CPU 104 calculates TonrMax by using TDMax and DMax to obtain the toner amount exceeding the limit value.

As a result, when magenta exceeds the limit value by 5%, yellow exceeds the limit value by 10%, and black exceeds the limit value by 20%, the CPU 104 calculates the sum of toner amounts exceeding 100% and subtracts the sum from the estimated limit value. In this case, since the estimated limit value is 250%, the CPU 104 determines a value obtained by subtracting (6.25+5+10+20) from 250%, i.e., 208.75%, as a new recording material limit value 504.

In any printer state, this calculation enables the toner amount to be reliably set to a value equal to or less than the estimated limit value, and the toner amount can be prevented from exceeding the limit value. More specifically, in the present exemplary embodiment, when the toner amount increases because of terminal point correction by the gamma correction processing units 413 to 443, this calculation decreases the toner amount limit value in the total toner amount control unit 402, thus reducing the toner amount output from the printer to the toner amount limit value or below.

The CPU 104 performs this calculation at a timing when the gamma correction tables are updated and feeds back the result to the toner amount limit value each time calculation is made. More specifically, in calibration processing, the CPU 104 performs the processing illustrated in the flow chart in FIG. 6 and the processing illustrated in the flow chart in FIG. 10 in succession to update the toner amount limit value.

Although, in the present exemplary embodiment, the gamma correction tables are updated by outputting a test pattern onto paper, reading it with a densitometer, and converting the toner amount limit value by using the read values, the following method may also be used. More specifically, it is also possible to measure the density of patches on the photosensitive drum with a density sensor in the printer unit to measure density variation of the printer, and then update the toner amount limit value by using the measured values.

According to the first exemplary embodiment, the image processing apparatus can, in any printer engine state, calculate an optimal toner amount limit value for controlling the total toner amount, output as a solid region an image which should be output as a solid image while maintaining the stability in color reproduction and gradation, and maintain the total toner amount at the output time to the limit value or below.

Although, in the first exemplary embodiment, identical processing is applied to all of CMYK colors, the processing may be applied only to a specific color (for example, a color with which jaggies or thin line discontinuities occur when the terminal point correction processing is not applied). The gamma correction processing without terminal point correction may be applied to colors other than the specific color. In this case, of course, limiting the specific color to only one color reduces the toner amount limit value to be subtracted, enabling giving higher priority to the gradation and tint. In many cases, black is generally used as the specific color since black does not affect colors that much but largely affects jaggies and discontinuities.

Although values have been described as an 8-bit signal having a maximum value of 255, values are not limited thereto.

In the first exemplary embodiment, a test chart is read, the density of the test chart is measured to acquire gamma correction tables and the solid output density DMax, and the toner amount limit value is calculated based on the acquired density DMax. A second exemplary embodiment will be described below centering on a method for predicting the solid region output density DMax based on a gamma correction table, which is created in advance, and calculating the toner amount limit value based on the predicted DMax value.

In the present exemplary embodiment, the configuration, overview, and block diagram of the image processing apparatus, and the total toner amount control processing are equivalent to those in the first exemplary embodiment, and duplicated explanation will be omitted. A method for creating a gamma correction table and calculating a limit value for total toner amount control, which are different from that in the first exemplary embodiment, will be described below.

Figure 11:
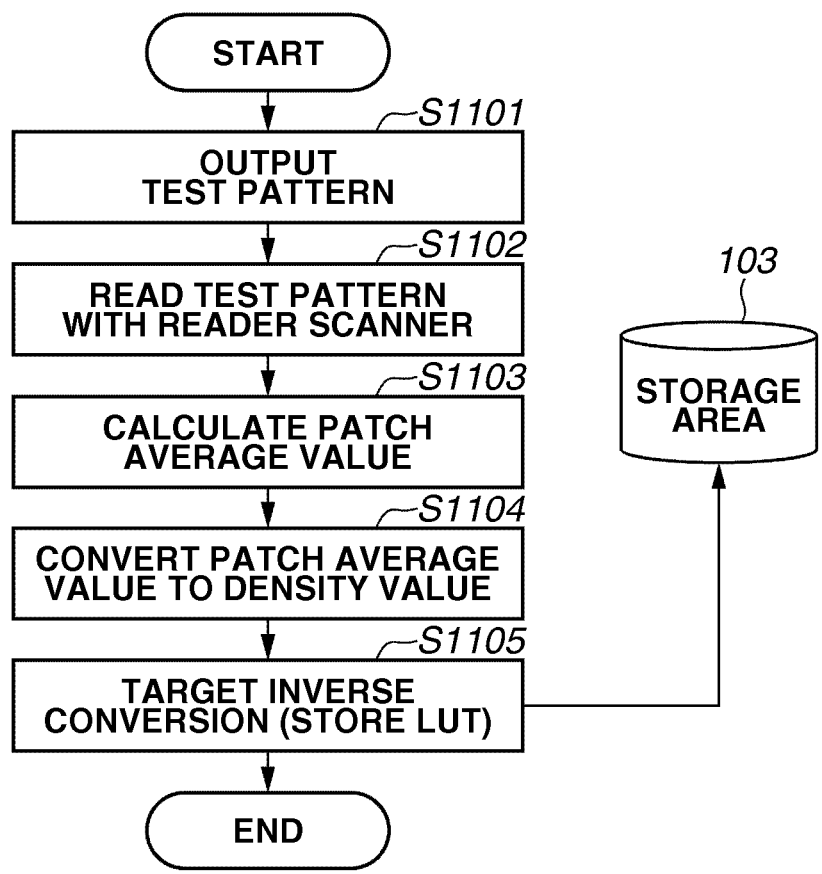
FIG. 11 is another flowchart illustrating processing for creating the gamma correction LUT according to the exemplary embodiment of the present invention.

FIG. 11 is a flow chart illustrating a method for creating a gamma correction table according to the present exemplary embodiment. Processing in steps S1101, S1102, and S1103 in FIG. 11 is similar to the processing in steps S601, S602, and S603 in FIG. 6, respectively. The present exemplary embodiment is characterized in processing in steps S1104 and S1105 in FIG. 11.

Processing in steps S1104 and S1105 in FIG. 11 will be described below. In step S1104, the CPU 104 converts the patch average value obtained in step S1103 into a density value. Since a read signal from the reader scanner is recognized as a linear signal with respect to the reflectance, logarithmic conversion is generally applied to conversion to density. For example, when the input luminance is read as an 8-bit signal, formula (4) can be applied.

Formula (4) is a conversion formula for normalizing a luminance signal S so that a density D becomes 255 when the document density is 1.6. If the density D exceeds 255, it needs to be limited to 255. The density may be calculated by using formula (4), or obtained through conversion by using a table having a luminance input and a density output.

FIG. 8 illustrates an exemplary result of density measurement obtained in this way. In FIG. 8, the density of each patch is marked with a circle "o." The density of patch No. 0 is plotted as D0, the density of patch No. 1 is plotted as D1, and so on. With the density characteristics (a density curve 81) in FIG. 8, it can be specified that the density when the printer outputs a solid region (i.e., when the printer output signal value is 255) is plotted as D7. The present exemplary embodiment differs from the first exemplary embodiment in that the CPU 104 stores the gamma correction table not having undergone terminal point correction calculated from measured values of the test pattern without storing the solid region output density (hereinafter referred to as DMax) and applying the terminal point correction in step S606 in FIG. 6.

In step S1105, the CPU 104 stores the gamma correction table 91 in FIG. 9 having the inverse characteristics of the density curve 81 in FIG. 8 in the storage unit 103, and maintains it therein until the gamma correction table 91 is changed.

If image data having undergone gamma correction is output using the gamma correction tables, full coincidence of the target density characteristics is guaranteed although the solid region density is not guaranteed. In some cases, therefore, it is more preferable to apply gamma correction using the gamma correction tables to such an image as a photographic image with which higher priority is given to the gradation than jaggies and discontinuities.

Figure 14:
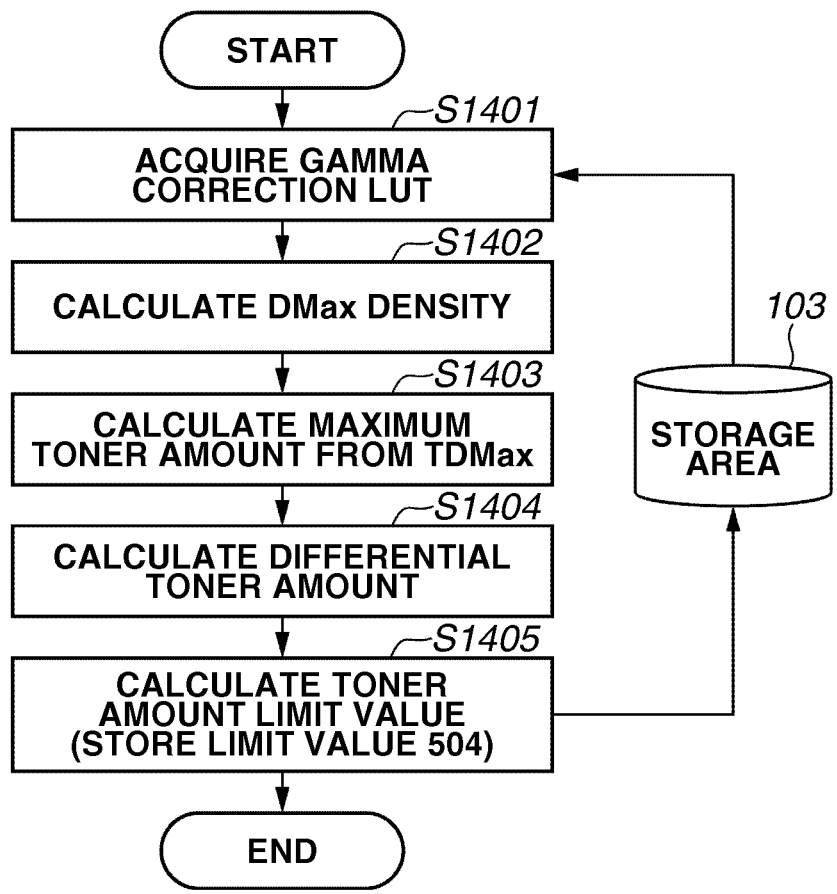
FIG. 14 is a flow chart illustrating processing for calculating total toner amount control values according to the exemplary embodiment of the present invention.

A method for estimating the solid region output density DMax from the above-described gamma correction tables and calculating the limit value 504 for total toner amount control will be described below with reference to FIG. 14. Processing illustrated in the flow chart in FIG. 14 is implemented when the CPU 104 loads a relevant program for executing each step of the flowchart in FIG. 14 from the storage unit 103 to a RAM (not illustrated) and then executes it.

In step S1401, the CPU 104 reads the gamma correction tables created and stored in step S1105 in FIG. 11. In step S1402, the CPU 104 calculates the solid region output density DMax. Although the solid region density measured with the reader scanner is used in the first exemplary embodiment, the present exemplary embodiment calculates DMax from a terminal point A in the gamma correction table 91 in FIG. 9 which varies with the printer state.

The terminal point A in the gamma correction table, that is an output signal value Wmax when an input signal value is 255, will be a signal value when the printer outputs the target maximum density TDMax estimated for the printer. From the densities TDMax and Wmax, DMax is obtained through linear presumption by using formula (6).

$$DMax = TDMax * 255/Wmax \quad \text{Formula (6)}$$

DMax may be calculated by using formula (6), or obtained through conversion using a table having Wmax as input and the density DMax as output. Thus, DMax can be calculated directly from the gamma correction tables not having undergone terminal point correction.

Processing in steps S1403 to S1405 is similar to the processing in steps S1002 to S1004 in FIG. 10, respectively, described in the first exemplary embodiment, and thus duplicated explanation will be omitted.

In step S1105, the CPU 104 stores in the storage unit 103 the gamma correction table 91 not having undergone terminal point correction. The gamma correction tables having undergone terminal point correction can be calculated from the gamma correction tables not having undergone terminal point correction. However, once the terminal point correction processing is applied, the gamma correction tables cannot be restored to the one before applying terminal point correction with which the gradation is given priority. Therefore, it may be desirable in some cases to store the gamma correction tables not having undergone terminal point correction.

For example, when outputting a photographic image which attaches importance to the gradation, the CPU 104 applies gamma correction using the stored gamma correction tables not having undergone terminal point correction. On the other hand, when outputting texts and lines, the CPU 104 corrects the terminal point of the stored gamma correction tables and then applies gamma correction using the gamma correction tables having undergone terminal point correction. Thus, if the gamma correction tables not having undergone terminal point correction is stored, gamma correction can be performed by switching between the gamma correction tables not having undergone terminal point correction and the gamma correction tables having undergone terminal point correction, according to the details of the image.

When using the gamma correction tables not having undergone terminal point correction, since densities exceeding TDMax are not output, it is neither necessary to recalculate the limit value used in the total toner amount control processing based on DMax nor to change the toner amount limit value. On the other hand, when using the gamma correction tables having undergone terminal point correction, it is necessary to update the limit value used in the total toner amount control processing from DMax, similarly to the first exemplary embodiment. The final toner amount limit value can be calculated by applying this processing to each of CMYK colors.

With the above configuration, the DMax value can be predicted based on the stored gamma correction tables not having undergone terminal point correction.

Although, in the present exemplary embodiment, identical processing is applied to all of CMYK colors, the processing may be applied only to a specific color similarly to the first exemplary embodiment.

Black affects jaggies and discontinuities caused by failure to apply the terminal point correction processing, to more extent than any other colors. On the other hand, C (cyan), M (magenta), and Y (yellow) affect the gradation and tint after applying the terminal point correction processing and the toner amount limitation processing. In a third exemplary embodiment, only black is subjected to gamma correction having undergone terminal point correction, and C (cyan), M (magenta), and Y (yellow) are subjected to gamma correction without terminal point correction.

In the first and second exemplary embodiments, the CPU 104 feeds back the toner amount exceeding the target maximum density TDMax to the toner amount limit value to subtract the exceeding value from the estimated limit value, thus the toner amount is reliably limited to the estimated limit value or below in any printer state. However, for example, when a printer having an estimated limit value of 205% outputs a black solid image which is 1.1 times darker than the estimated limit value, i.e., a solid region output density is equivalent to 110% toner amount, applying the processing according to the first exemplary embodiment reduces the estimated limit value to 195%.

Change in values caused by the total toner amount control processing according to the first exemplary embodiment will be described below with reference to FIGS. 13A and 13B. Referring to FIGS. 13A and 13B, the CMYK values before total toner amount control are listed on the left-hand side, and the CMYK values after total toner amount control are listed on the right-hand side. SIGNAL VALUE indicates CMYK values before the total toner amount control processing. EQUIVALENT VALUE indicates CMYK values to be printed with the actual printer state reflected. With black, the equivalent value is 1.1 times the signal value. This toner amount is determined based on a consideration that DMax of black is 1.1 times darker than the estimated limit value.

Referring to FIG. 13A, although the total value of the signal value is limited to an estimated limit value of 205%, that of the equivalent value is 214% that exceeds 205%. In this case, therefore, since the toner amount is controlled by setting the limit value to 195% in the total toner amount control processing, the total value of the equivalent value is limited to 204.5% which is within the estimated limit value of 205%.

However, referring to FIG. 13B, when the black color component is zero, signal values for non-black colors are excessively reduced. In this case, since black is not included in the input, the total value of the signal value and that of the equivalent value are both within 205%. However, if total toner amount limitation is applied to this case by setting the limit value to 195% similarly to the case in FIG. 13A, the final total value of the equivalent value becomes 195.5% which means excessive toner amount limitation. In this case, tint without black changes to tint with black resulting in dull colors and degraded image quality.

Processing performed by the total toner amount control unit 402 according to the present exemplary embodiment to prevent such excessive toner amount reduction will be described below.

In the present exemplary embodiment, the configuration, overview, and block diagram of the image processing apparatus are equivalent to those in the first and second exemplary embodiments, and duplicated explanation will be omitted. The total toner amount control processing according to the present exemplary embodiment, which is different from that in the first and second exemplary embodiments, will be described below. In the present exemplary embodiment, a limit value for total toner amount control is not calculated and stored (processing in steps S1004 and S1405 is not performed). Instead, a predetermined estimated limit value is used as a limit value.

Figure 12:
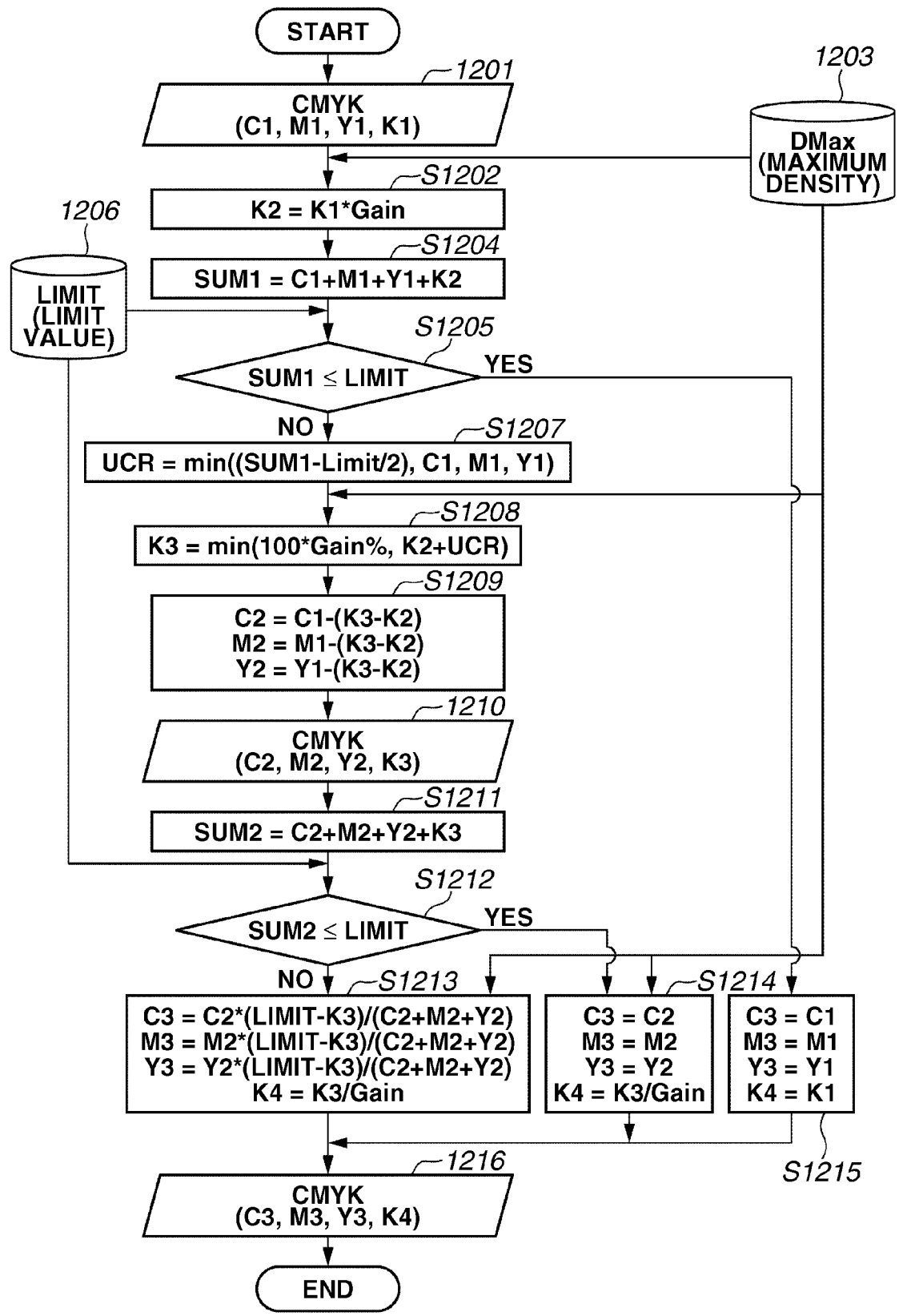
FIG. 12 is another flowchart illustrating processing for controlling the total toner amount according to the exemplary embodiment of the present invention.

Processing performed by the total toner amount control unit 402 will be described below with reference to FIG. 12. Since the basic processing flow has been described above in the first exemplary embodiment with reference to FIG. 5, FIG. 12 will be described below centering on a difference from FIG. 5.

In step S1202, the total toner amount control unit 402 multiplies K1 of CMYK (C1, M1, Y1, K1) 1201 input thereto by Gain to obtain K2. Gain used in step S1202 is calculated by formula (7).

$$\text{Gain} = D\text{Max}/TD\text{Max} \qquad \text{Formula (7)}$$

Formula (7) calculates Gain using the stored or calculated maximum density DMax 1203 and the target density TDMax.

For example, in a printer state where an image with TDMax=1.6 and DMax=1.7 is darkly printed, Gain becomes 1.7/1.6=1.06. The calculated Gain is used to calculate the toner amount when black is output in this printer state. More specifically, Gain serves as a toner amount conversion value in the present printer state. Of course, when TDMax=DMax, Gain equals one and the toner amount remains unchanged.

In step S1204, the total toner amount control unit 402 calculates a sum SUM1 of the values of C1, M1, and Y1 and K2.

In step S1205, the total toner amount control unit 402 reads LIMIT (limit value) 1206 and compares it with SUM1. LIMIT (limit value) 1206 is a limit value of a toner amount which can be fixed, and is defined by a numerical value, such as "250%."

In the present exemplary embodiment, the limit value is not updated at the time of gamma correction table creation. This is because the estimated toner amount in consideration of the printer state has been obtained with multiplication of the value of black by Gain in step S1202, and therefore it is not necessary to subtract the excessive toner amount from the estimated limit value.

Although, in the first and second exemplary embodiments, the toner amount limit value is reduced without multiplying the input value by Gain, in the third exemplary embodiment, the total toner amount control unit 402 multiplies the input value by Gain in consideration of the printer state and compares the resultant input value with the toner amount limit value. In the third exemplary embodiment, the total toner amount control unit 402 does not subtract from the toner amount limit value the toner amount exceeding the estimated limit value.

When SUM1 is equal to or less than LIMIT (limit value) 1206 (YES in step S1205), the processing proceeds to step S1215. In step S1215, the total toner amount control unit 402 outputs CMYK (C1, M1, Y1, K1) 1201 as CMYK (C3, M3, Y3, K3) 1216. In this case, the total toner amount control unit 402 does not use K2, which is obtained with multiplication by Gain, but outputs K1 of input CMYK (C1, M1, Y1, K1) 1201.

When SUM1 is larger than LIMIT (limit value) 1206 (NO in step S1205), the processing proceeds to step S1207. In step S1207, the total toner amount control unit 402 calculates the UCR value by using formula (1). Since formula (1) has been described in step S505, duplicated explanation will be omitted.

In step S1208, the total toner amount control unit 402 calculates K3 out of C2, M2, Y2, and K3 which are values after first total toner amount limitation. A sum of K2 and the UCR value is basically used. In S506, it is described that K2 alone cannot be set to a value exceeding 100%. At the present time, black is multiplied by Gain and therefore the maximum value can be calculated by 100*Gain.

In step S1209, the total toner amount control unit 402 reduces the values of C1, M1, and Y1 by (K3−K2) to obtain the values of C2, M2, and Y2, respectively. The total toner amount control unit 402 performs the above-described processing flow to obtain CMYK (C2, M2, Y2, K3) 1210 with reduced total toner amount.

In step S1211, the total toner amount control unit 402 calculates a sum. SUM2 of C2, M2, Y2, and K3. In step S1212, the total toner amount control unit 402 reads LIMIT (limit value) 1206 and compares it with SUM2. When SUM2 is equal to or less than LIMIT (limit value) 1206 (YES in step S1212), the processing proceeds to step S1214. In step S1214, the total toner amount control unit 402 outputs CMY (C2, M2, Y2) 1210 as CMY (C3, M3, Y3) 1216, and calculates K4 using formula (8) including Gain used in step S1202.

$$K4 = K3/\text{Gain} \qquad \text{Formula (8)}$$

This is an inverse operation of the calculation in step S1202.

When SUM2 is larger than LIMIT (limit value) 1206 (NO in step S1212), the processing proceeds to step S1213. In step S1213, the total toner amount control unit 402 calculates a value of K4 from K3 using Gain similarly to step S1214. Then, a coefficient is calculated from LIMIT (limit value) 1206 reduced by K3 and the sum of C2, M2, and Y2. Then, the total toner amount control unit 402 multiplies C2, M2, and Y2 by the obtained coefficient to calculate C3, M3, and Y3 with reduced toner amount, and outputs CMYK (C3, M3, Y3, K4) 1216.

As illustrated in FIG. 13B, the above-described processing prevents excessive limitation in C, M, and Y toner amounts, thus preventing degradation in image quality.

In steps S1202, S1208, S1213, and S1214 in the present exemplary embodiment, the total toner amount control unit 402 performs multiplication and division of the input value and upper limit value of black by Gain to make toner amount conversion in a printer state which is determined by the relation between DMax and TDMax. However, toner amount conversion can also be performed through table conversion by using the one-dimensional LUT in consideration of the nonlinear characteristics of the printer and its inverse table.

Although the total toner amount control unit 402 performs multiplication and division of values of black by Gain, similar processing can be achieved with multiplication and division of the input values and limit values of C, M, and Y by a reciprocal of Gain. In this case, since the upper limit value of black remains 100%, it is not necessary to perform multiplication by Gain when acquiring the minimum value in step S1208.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-227553 filed Oct. 7, 2010, which is hereby incorporated by reference herein in its entirety.

What is claimed is:

1. An image processing apparatus capable of controlling an amount of a recording material corresponding to image data, the image processing apparatus comprising:
a storage unit configured to store a gradation correction table calculated based on data acquired by reading a patch pattern formed by an image forming unit;
a calculation unit configured to calculate a maximum density value of an image formed by the image forming unit using an output signal value corresponding to a maximum value of an input signal in the gradation correction table and a maximum density value to be targeted by the image processing apparatus;
an acquisition unit configured to acquire an amount of toner required at the time of outputting the maximum density value of the image formed by the image forming unit, using the maximum density value of the image formed by the image forming unit and the maximum density value to be targeted by the image processing apparatus;
a determination unit configured to calculate an exceeding amount of toner that exceeds an estimated limit value, from the amount of toner acquired by the acquisition unit, and determine a value remaining by subtracting the exceeding amount of toner from the estimated limit value, as a limit value of a total amount of a plurality of recording materials; and
a control unit configured to control the total amount of the plurality of recording materials corresponding to the image data to be equal to or less than the limit value determined by the determination unit,
wherein the limit value of the total amount of the plurality of recording materials determined by the determination unit varies according to a difference between the maximum density value of the image formed by the image forming unit and the maximum density value to be targeted by the image processing apparatus,
wherein as the maximum density value of the image formed by the image forming unit becomes larger than the maximum density value to be targeted by the image processing apparatus, and the exceeding amount of toner increases in conjunction with increase of the maximum density value of the image formed by the image forming unit, the limit value of a total amount of a plurality of recording materials becomes smaller, and
wherein as the maximum density value of the image formed by the image forming unit becomes larger than the maximum density value to be targeted by the image processing apparatus, and the exceeding amount of toner increases in conjunction with increase of the maximum density value of the image formed by the image forming unit, the total amount of the plurality of recording materials corresponding to the image data that the control unit controls becomes smaller.

2. The image processing apparatus according to claim 1, further comprising:
a change unit configured to change the gradation correction table so that a maximum gradation level of an input signal coincides with a maximum gradation level of an output signal in the gradation correction table; and
a gradation correction unit configured to apply gradation correction to the image data in which the amount of the recording material is controlled by the control unit using the gradation correction table changed by the change unit.

3. The image processing apparatus according to claim 2, wherein the gradation correction unit applies gradation correction to a signal of a specific color of the image data controlled by the control unit using the gradation correction table changed by the change unit, and applies gradation correction to a signal of other than the specific color of the image data using the gradation correction table before changed by the change unit.

4. A non-transitory computer-readable medium storing a computer-executable process, the computer-executable process causing a computer to function as an image processing apparatus according to claim 1.

5. An image processing apparatus capable of controlling an amount of a recording material corresponding to image data, the image processing apparatus comprising:
an acquisition unit configured to acquire an amount of toner required at the time of outputting a maximum density value of an image formed by an image forming unit based on the maximum density value of the image formed by the image forming unit and a maximum density value to be targeted by the image processing apparatus;
a determination unit configured to calculate an exceeding amount of toner that exceeds an estimated limit value, from the amount of toner acquired by the acquisition unit, and determine a value remained by subtracting the exceeding amount of toner from the estimated limit value, as a limit value of a total amount of a plurality of recording materials; and
a control unit configured to control the total amount of the plurality of recording materials corresponding to the image data to be equal to or less than the limit value determined by the determination unit,
wherein the limit value of the total amount of the plurality of recording materials determined by the determination unit varies according to a difference between the maximum density value of the image formed by the image forming unit and the maximum density value to be targeted by the image processing apparatus,
wherein as the maximum density value of the image formed by the image forming unit becomes larger than the maximum density value to be targeted by the image processing apparatus, and the exceeding amount of toner increases in conjunction with increase of the maximum density value of the image formed by the image forming unit, the limit value of a total amount of a plurality of recording materials becomes smaller, and
wherein as the maximum density value of the image formed by the image forming unit becomes larger than the maximum density value to be targeted by the image processing apparatus, and the exceeding amount of toner increases in conjunction with increase of the maximum density value of the image formed by the image forming unit, the total amount of the plurality of recording materials corresponding to the image data that the control unit controls becomes smaller.

6. A non-transitory computer-readable medium storing a computer-executable process, the computer-executable process causing a computer to function as an image processing apparatus according to claim 5.

7. A method for processing an image in an image processing apparatus capable of controlling an amount of a recording material corresponding to image data, the method comprising:

storing a gradation correction table calculated based on data obtained by reading a patch pattern formed by an image forming unit;

calculating a maximum density value of an image formed by the image forming unit using an output signal value corresponding to a maximum value of an input signal in the gradation correction table and a maximum density value to be targeted by the image processing apparatus;

acquiring an amount of the toner required at the time of outputting the maximum density value of the image formed using the maximum density value of the image formed and the maximum density value to be targeted;

calculating an exceeding amount of the toner that exceeds an estimated value, from the amount of the toner acquired and determine a value remaining by subtracting the exceeding amount of toner from the estimated value, as a limit value of a total amount of a plurality of recording materials; and controlling the total amount of the plurality of recording materials corresponding to the image data to be equal to or less than the determined limit value, wherein the determined limit value of the total amount of the plurality of recording materials varies according to a difference between the maximum density value of the image formed and the maximum density value to be targeted by the image processing apparatus, wherein as the maximum density value of the image formed becomes larger than the maximum density value to be targeted, and the exceeding amount of toner increases in conjunction with increase of the maximum density value of the image formed, the limit value of a total amount of a plurality of recording materials becomes smaller, and wherein as the maximum density value of the image formed becomes larger than the maximum density value to be targeted, and the exceeding amount of toner increases in conjunction with increase of the maximum density value of the image formed, the total amount of the plurality of recording materials corresponding to the image data controlled becomes smaller.

8. A method for processing an image in an image processing apparatus capable of controlling an amount of a recording material corresponding to image data, the method comprising:

acquiring an amount of toner required at the time of outputting a maximum density value of an image formed based on the maximum density value of the image formed and a maximum density value to be targeted by the image processing apparatus;

calculating an exceeding amount of toner that exceeds an estimated limit value, from the amount of toner acquired, and determine a value remaining by subtracting the exceeding amount of toner from the estimated limit value, as a limit value of a total amount of a plurality of recording materials; and controlling the total amount of the plurality of recording materials corresponding to the image data to be equal to or less than the determined limit value, wherein the determined limit value of the total amount of the plurality of recording materials varies according to a difference between the maximum density value of the image formed and the maximum density value to be targeted by the image processing apparatus, wherein as the maximum density value of the image formed becomes larger than the maximum density value to be targeted, and the exceeding amount of toner increases in conjunction with increase of the maximum density value of the image formed, the limit value of a total amount of a plurality of recording materials becomes smaller, and wherein as the maximum density value of the image formed becomes larger than the maximum density value to be targeted by the image processing apparatus, and the exceeding amount of toner increases in conjunction with increase of the maximum density value of the image formed, the total amount of the plurality of recording materials corresponding to the image data controlled becomes smaller.

\* \* \* \* \*